US010975969B2

(12) United States Patent
Kelly et al.

(10) Patent No.: US 10,975,969 B2
(45) Date of Patent: Apr. 13, 2021

(54) THREE-POSITION POPPET VALVE

(71) Applicant: HAMILTON SUNDSTRAND CORPORATION, Charlotte, NC (US)

(72) Inventors: Myles R. Kelly, Willimantic, CT (US); James S. Elder, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 106 days.

(21) Appl. No.: 16/145,877

(22) Filed: Sep. 28, 2018

(65) Prior Publication Data

US 2020/0103045 A1    Apr. 2, 2020

(51) Int. Cl.
*F16K 1/12* (2006.01)

(52) U.S. Cl.
CPC .................................. *F16K 1/126* (2013.01)

(58) Field of Classification Search
CPC ........ F16K 1/12; F16K 1/126; F16K 31/1221; F16K 31/124; F16K 31/1225; F16K 17/30; F02C 7/232
See application file for complete search history.

(56) References Cited

U.S. PATENT DOCUMENTS

| | | | |
|---|---|---|---|
| 2,834,377 A | 5/1958 | Bragg | |
| 3,818,921 A * | 6/1974 | Peczkowski | G05D 16/10 137/501 |
| 4,610,265 A * | 9/1986 | Nelson | F16K 1/126 137/219 |
| 5,174,332 A * | 12/1992 | Yokoyama | F16K 17/30 137/517 |
| 5,533,873 A * | 7/1996 | Kindl | F04B 49/225 137/529 |
| 6,095,187 A | 8/2000 | Hotchkiss | |
| 6,213,447 B1 | 4/2001 | Bircann et al. | |
| 6,945,508 B2 | 9/2005 | Lewis et al. | |
| 7,225,830 B1 | 6/2007 | Kershaw | |
| 7,669,830 B2 | 3/2010 | Franconi | |
| 7,921,880 B2 | 4/2011 | Jackson et al. | |
| 7,984,701 B2 | 7/2011 | Re Fiorentin et al. | |
| 9,309,979 B2 | 4/2016 | Russell | |
| 9,494,248 B2 | 11/2016 | Stucchi et al. | |
| 2017/0101937 A1 | 4/2017 | Schlarman | |

FOREIGN PATENT DOCUMENTS

| | | |
|---|---|---|
| CA | 3046144 | 6/2018 |
| GB | 809531 | 2/1959 |

OTHER PUBLICATIONS

The Extended European Search Report for European Patent Application No. 19195999.8 dated Feb. 12, 2020.

* cited by examiner

*Primary Examiner* — Eric Keasel
(74) *Attorney, Agent, or Firm* — Carlson, Gaskey & Olds, P.C.

(57) ABSTRACT

A valve according to an example of the present disclosure includes a poppet head configured to move with respect to a valve outlet of the valve. A first spring is configured to be compressed with a force generated by fluid flow through the valve, and compression of the first spring allows the poppet head to move towards the valve outlet. A second spring is configured to allow the poppet head to move toward the valve outlet when compressed. A method for controlling fluid flow is also disclosed.

3 Claims, 1 Drawing Sheet

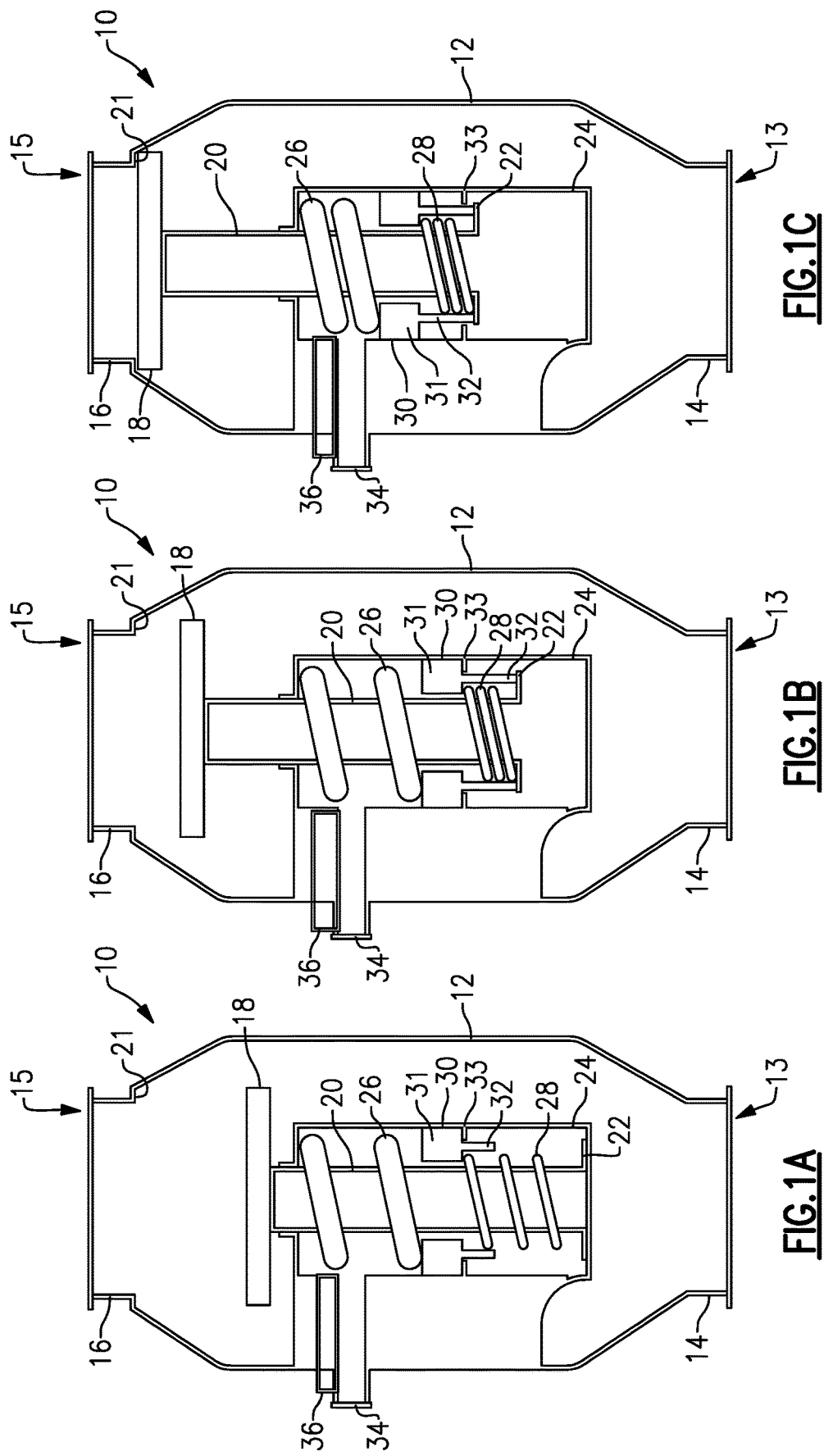

THREE-POSITION POPPET VALVE

BACKGROUND

This application relates generally to a poppet valve.

Engines, and in particular gas turbine engines such as for aircraft, have pneumatic, hydraulic, and/or fueldraulic systems that require controlling fluid flow for operation. Fluid flow control is accomplished by various valves. One example type of valve is a poppet valve. Poppet valves generally include an aperture and a poppet head that seats against the aperture to control fluid flow through the aperture. The poppet head is moved with respect to the aperture, typically moved via a solenoid valve, servo-valve, or torque/electric motor, that applies a force to the plug to bring it to a desired location.

SUMMARY

A valve according to an example of the present disclosure includes a poppet head configured to move with respect to a valve outlet of the valve. A first spring is configured to be compressed with a force generated by fluid flow through the valve, and compression of the first spring allows the poppet head to move towards the valve outlet. A second spring is configured to allow the poppet head to move toward the valve outlet when compressed.

In a further embodiment according to any of the foregoing embodiments, the second spring is configured to be compressed by an outside force.

In a further embodiment according to any of the foregoing embodiments, the outside force is provided by a muscle fluid controlled by a solenoid valve.

In a further embodiment according to any of the foregoing embodiments, a piston is connected to the poppet head at a first end of the piston, and a flange at a second end of the piston opposite the first end.

In a further embodiment according to any of the foregoing embodiments, the first and second springs are arranged concentrically around the piston.

In a further embodiment according to any of the foregoing embodiments, the first and second springs and the piston are arranged in an inner housing.

In a further embodiment according to any of the foregoing embodiments, a stopper is arranged between the first and second springs in the inner housing.

In a further embodiment according to any of the foregoing embodiments, the stopper includes a body portion configured to engage a lip in the inner housing and a leg configured to engage the flange.

In a further embodiment according to any of the foregoing embodiments, the body portion engages the lip when the first spring is compressed but not when the second spring is compressed.

In a further embodiment according to any of the foregoing embodiments, the leg engages the flange when the first and second springs are compressed.

In a further embodiment according to any of the foregoing embodiments, the first spring has a lower resistance than the second spring.

In a further embodiment according to any of the foregoing embodiments, the fluid flow is fluid flow in one of a pneumatic, hydraulic, or fuel system in a gas turbine engine.

In a further embodiment according to any of the foregoing embodiments, the valve controls fluid flow in a pneumatic, hydraulic, or fuel system for a gas turbine engine.

In a further embodiment according to any of the foregoing embodiments, the poppet head is configured to contact a seat of the valve outlet when the first and second springs are compressed.

A method of controlling fluid flow according to an example of the present disclosure includes a moving a poppet head towards a valve outlet. A first spring is compressed with a force generated by fluid flow through a valve. The poppet head is moved to a fully closed position against the valve outlet. A second spring is compressed with an outside force.

In a further embodiment according to any of the foregoing embodiments, a method for controlling fluid flow includes providing the outside force with a muscle fluid controlled by a solenoid valve.

In a further embodiment according to any of the foregoing embodiments, a method for controlling fluid flow includes compressing the first spring with less force than the second spring.

In a further embodiment according to any of the foregoing embodiments, the poppet head is attached to a piston, and the poppet head, the piston, the first spring, and the second spring are arranged in an inner housing.

In a further embodiment according to any of the foregoing embodiments, a stopper is arranged between the first and second springs, and the first spring is compressed between the stopper and a flange on the piston.

In a further embodiment according to any of the foregoing embodiments, a stopper is arranged between the first and second spring, and the second spring is compressed between the stopper and the inner housing.

In a further embodiment according to any of the foregoing embodiments, the fluid flow is fluid flow in one of a pneumatic, hydraulic, or fuel system in a gas turbine engine.

BRIEF DESCRIPTION OF THE DRAWINGS

FIG. 1a schematically shows a poppet valve in a fully closed state.

FIG. 1b schematically shows a poppet valve in an intermediate state.

FIG. 1c schematically shows a poppet valve in a fully open state.

DETAILED DESCRIPTION

A poppet valve includes a poppet head that seats against an aperture to control flow of fluid through the aperture. Certain applications, for instance, pneumatic, hydraulic, and fuel systems in a gas turbine engine, utilize three-position poppet valves, e.g., poppet valves that are operable in a fully open position, a fully closed position, and an intermediate position. The present poppet valve includes an actuation mechanism that holds the poppet valve in one of the three positions without the use of a servo-valve or torque/electric motor.

Some three-position poppet valves that utilize a servo valve/motor are held in the intermediate position by creating a force balance at the intermediate position. A force margin is a measure of the force balance, and compares the driving force behind an actuator to a resisting force of the actuation. Force margin is generally determined as follows: force margin=driving force/resisting force−1. In the servo valve/motor example, the force margin is zero in the intermediate position because the servo valve/motor provides a driving force equal to the resisting force. On the other hand, the present poppet valve is held in the intermediate position with a non-zero force margin, e.g., the driving force is not equal to the resisting force. Because the driving force and resisting force do not have to be balanced, eliminating the servo-vale/torque motor reduces the complexity of the software logic for controlling the valve, the complexity of the system hardware, and allows the use of a solenoid, reducing cost of the system.

FIGS. 1a-c schematically show the present poppet valve 10. In FIG. 1a, the poppet valve 10 is in a fully open position. In FIG. 1b, the poppet valve is in an intermediate position. In FIG. 1c, the poppet valve is in a fully closed position.

The poppet valve 10 includes a housing 12 with an inlet 13 and an inlet flange 14. The poppet valve 10 also includes an outlet 15 and an outlet flange 16. The poppet valve 10 controls fluid flow from the inlet flange 14 to the outlet flange 16 via movement of a poppet head 18. The poppet head 18 is attached to one end of a piston 20. At the opposite end from the poppet head 18, the piston 20 has a flange 22.

The piston 20 is arranged in an inner housing 24. Within the inner housing 24 and concentrically around the piston 20 are two springs 26, 28. A stopper 30 is arranged in between the springs 26, 28. The stopper includes a body portion 31 and a leg portion 32 extending from the body portion 31. The body portion 31 is configured to engage a lip 33 in the inner housing 24 and the leg portion 32 is configured to engage the flange 22 of the piston 20 in some positions, as will become apparent from the subsequent disclosure. In one example, the stopper 30 includes seals that seal against the inner housing 24. In one example, the piston 20 also has a seal which seals against stopper 30 to prevent solenoid 36 commanded muscle pressure (discussed below) from entering a lower portion of inner housing 24 which spring 28 is in.

A muscle flange 34 extends through the inner housing 24 and housing 12 to enable a muscle source (e.g., a fluid) to assist spring 26 in holding the valve in the intermediate position as shown in FIG. 1B. The muscle source is controlled by a pneumatic solenoid valve 36, which allows the muscle fluid to fill an upper portion of inner housing 24 of spring 26 (to assist the spring 26 and maintain it in the position of FIGS. 1A and B) or vent it to ambient pressure (e.g., no muscle pressure assisting the spring 26). The muscle source controlled by the solenoid 36 can be the inlet 14 pressure source to the valve or another muscle source.

Turning now to the operation of the poppet valve 10, in the open state of FIG. 1a, both springs 26, 28 are fully expanded, or in a non-compressed state. The stopper 30 rests on the lip 33. The poppet head 18 is spaced away from the outlet flange 16 so that fluid can flow through the poppet valve 10.

In the intermediate state, shown in FIG. 1b, the poppet valve 10 takes advantage of pressure created by fluid flow from the inlet flange 14 to the outlet flange 16. This pressure urges the poppet head 18 towards the outlet flange 16 and the spring 28 to compress. The flange 22 on the piston 20, which is attached to the poppet head 18, also moves towards the outlet flange 16, such that the leg portion 32 of the stopper 30 engages the flange 22. This compresses 28 between the flange 22 and the body portion 31 of the stopper 30. In the intermediate position, the body portion 31 of the stopper 30 still rests on the lip 33. Muscle pressure is also supplied via the solenoid 36 to the inner housing 24 in order to act on stopper 30 to assist spring 26 in holding the poppet head 18 in the passive position. The solenoid 36 can be actuated by a controller according to any known logic.

Because the poppet valve 10 is controlling the flow of fluid and using pressure generated by the same fluid to cause actuation of the valve mechanism, this intermediate state is said to be "passively" actuated. When the pressure of the fluid flow overcomes the resistance of the spring 28, the poppet valve 10 moves into the intermediate state. Furthermore, since no driving force is provided, the force margin for the passive actuation is non-zero.

In the fully closed state, shown in FIG. 1c, the solenoid 36 is actuated to cause the spring 26 to compress. The solenoid 36 blocks the muscle pressure and vents the inner housing 24 to ambient pressure, allowing the poppet head 18 to translate to the fully closed position. The solenoid 36 can be actuated by a controller according to any known logic. In the fully closed state, the stopper 30 and piston 20 move toward the outlet flange 16, urging the poppet head 18 against a seat 21 of the outlet flange 16 to block fluid flow through the outlet flange 16. In this position, the body portion 31 of the stopper 30 disengages from the lip 33, but the leg 32 remain engaged with the flange 22. The spring 28 remains compressed between the flange 22 and the stopper 30. The spring 26 is compressed between the body portion 31 of the stopper 30 and the inner housing 24. Accordingly, when both springs 26, 28 are compressed, the poppet head 18 is in contact with the seat 21 of the outlet flange 16.

The actuation of the solenoid 36 (e.g., an outside force) provides an "active" actuation, as compared to the passive actuation discussed above, which only utilizes the force of fluid flow through the valve 10.

In one example, the "passive spring" 28 has a lower spring resistance than the "active spring" 26. In a further example, the resistance of the passive spring 28 is selected to allow the passive actuation in the intermediate state to occur at a certain desired fluid flow associated with a certain desired pressure.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A valve, comprising:
   a poppet head configured to move with respect to a valve outlet of the valve;
   a first spring configured to be compressed with a force generated by fluid flow through the valve, wherein compression of the first spring allows the poppet head to move towards the valve outlet;
   a second spring, configured to allow the poppet head to move toward the valve outlet when compressed;
   a piston connected to the poppet head at a first end of the piston;
   a flange at a second end of the piston opposite the first end, wherein the first and second springs are arranged concentrically around the piston, wherein the first and second springs and the piston are arranged in an inner housing; and
   a stopper arranged between the first and second springs in the inner housing wherein the stopper includes a body portion configured to engage a lip in the inner housing and a leg configured to engage the flange.

2. The valve of claim 1, wherein the body portion engages the lip when the first spring is compressed but not when the second spring is compressed.

3. The valve of claim 1, wherein the leg engages the flange when the first and second springs are compressed.

\* \* \* \* \*